US006834737B2

(12) United States Patent
Bloxham

(10) Patent No.: US 6,834,737 B2
(45) Date of Patent: Dec. 28, 2004

(54) HYBRID VEHICLE AND ENERGY STORAGE SYSTEM AND METHOD

(75) Inventor: Steven R. Bloxham, 1008 Alice St., Davis, CA (US) 95616

(73) Assignee: Steven R. Bloxham, Davis, CA (US)

(*) Notice: Subject to any disclaimer, the term of this patent is extended or adjusted under 35 U.S.C. 154(b) by 57 days.

(21) Appl. No.: 09/967,817

(22) Filed: Sep. 28, 2001

(65) Prior Publication Data

US 2002/0074175 A1 Jun. 20, 2002

Related U.S. Application Data

(60) Provisional application No. 60/237,457, filed on Oct. 2, 2000.

(51) Int. Cl.[7] .............................. B62M 1/10; B60K 1/00; F16D 31/02
(52) U.S. Cl. ......................... 180/165; 180/65.3; 60/414; 60/419
(58) Field of Search ............................... 180/165, 65.2, 180/65.3, 65.4, 65.6, 302; 280/212; 60/414, 415, 419; 417/225, 226, 386; 290/40 C

(56) References Cited

U.S. PATENT DOCUMENTS

| | | | | |
|---|---|---|---|---|
| 3,700,060 A | * | 10/1972 | Keene et al. | 180/65.3 |
| 3,704,760 A | | 12/1972 | Maruyama | |
| 3,880,250 A | * | 4/1975 | Emanuele | 180/65.2 |
| 3,945,207 A | | 3/1976 | Hyatt | |
| 4,018,052 A | * | 4/1977 | Laussermair | 60/414 |
| 4,098,144 A | * | 7/1978 | Besel et al. | 74/661 |
| 4,133,403 A | | 1/1979 | Priddy, Jr. et al. | |
| 4,246,978 A | * | 1/1981 | Schulz et al. | 180/165 |
| 4,281,256 A | * | 7/1981 | Ahrens et al. | 290/1 R |
| 4,326,380 A | * | 4/1982 | Rittmaster et al. | 60/595 |
| 4,441,573 A | | 4/1984 | Carman et al. | |
| 4,534,169 A | | 8/1985 | Hunt | |
| 4,578,955 A | * | 4/1986 | Medina | 60/709 |
| 4,632,205 A | * | 12/1986 | Lewis | 180/165 |
| 4,707,644 A | * | 11/1987 | Miller et al. | 318/136 |
| 4,724,672 A | * | 2/1988 | Olmsted | 60/371 |
| 4,760,697 A | * | 8/1988 | Heggie et al. | 60/408 |
| 4,763,751 A | * | 8/1988 | Gardner, Jr. | 180/305 |
| 4,888,949 A | * | 12/1989 | Rogers | 60/434 |

(List continued on next page.)

FOREIGN PATENT DOCUMENTS

| | | | | |
|---|---|---|---|---|
| DE | 4135875 | * | 10/1991 | 180/65.3 |
| WO | WO 92/01584 | | 7/1990 | |

OTHER PUBLICATIONS

Baumeister & Marks, editors. "Standard Handbook for Mechanical Engineers". Seventh Edition, 1967; pp. 8–55, 56: "Hydraulic Power Transmission"; "Accumulators".*

*Primary Examiner*—Christopher P. Ellis
*Assistant Examiner*—G B Klebe
(74) *Attorney, Agent, or Firm*—Dorsey & Whitney LLP

(57) ABSTRACT

A system for providing a hybrid vehicle with a practical source of auxiliary power. The system includes two electric motor/generators connected to each other in such a fashion so that when one electric motor/generator functions as a motor, the other becomes a generator with their roles being reversed depending on whether the system is in an auxiliary power mode or energy storage mode. Connected to one motor/generator is the vehicle drive train. Connected to the other motor/generator is a pressure energy storage system, which in the energy storage mode converts the force of rotation into pressurized gas for storage in an energy system and delivered in the form of electric current by the one motor/generator, and in the energy delivery mode converts the stored energy of the energy storage system into electric current for delivery to the one motor/generator which is part of the vehicle drive train to provide auxiliary power for practical hybrid vehicles.

14 Claims, 4 Drawing Sheets

U.S. PATENT DOCUMENTS

| | | | |
|---|---|---|---|
| 5,230,402 A | * | 7/1993 | Clark et al. .................. 180/307 |
| 5,341,644 A | * | 8/1994 | Nelson ......................... 60/627 |
| 5,384,521 A | * | 1/1995 | Coe ............................ 318/161 |
| 5,492,189 A | | 2/1996 | Kriegler et al. |
| 5,495,912 A | | 3/1996 | Gray, Jr. et al. |
| 5,505,527 A | | 4/1996 | Gray, Jr. et al. |
| 5,507,144 A | | 4/1996 | Gray, Jr. et al. |
| 5,579,640 A | | 12/1996 | Gray, Jr. et al. |
| 5,887,674 A | | 3/1999 | Gray, Jr. et al. |
| 6,054,838 A | * | 4/2000 | Tsatsis ........................ 320/101 |
| 6,454,033 B1 | * | 9/2002 | Nathan et al. ............. 180/65.1 |
| 6,460,332 B1 | * | 10/2002 | Maruta et al. ................ 60/414 |
| 6,719,080 B1 | * | 4/2004 | Gray, Jr. ..................... 180/165 |

\* cited by examiner

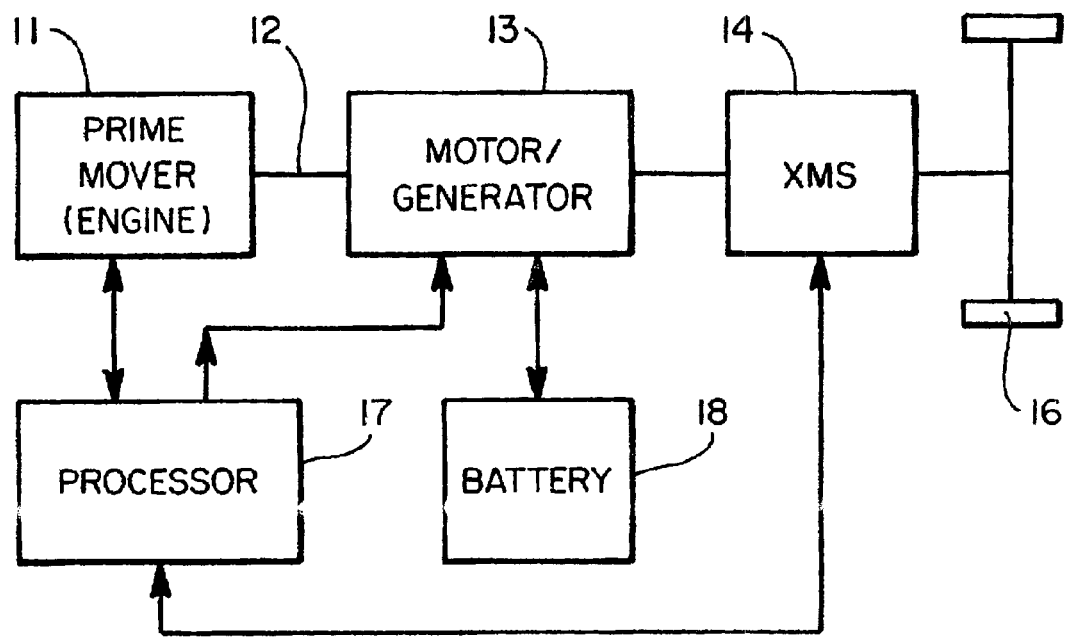
FIG_1
*(PRIOR ART)*
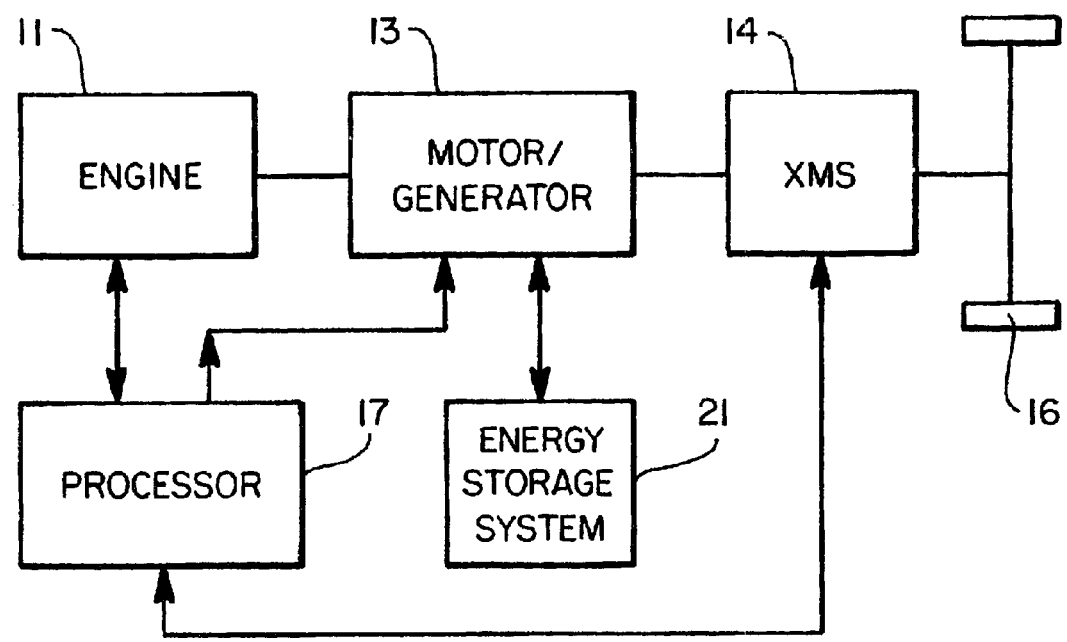
FIG_2

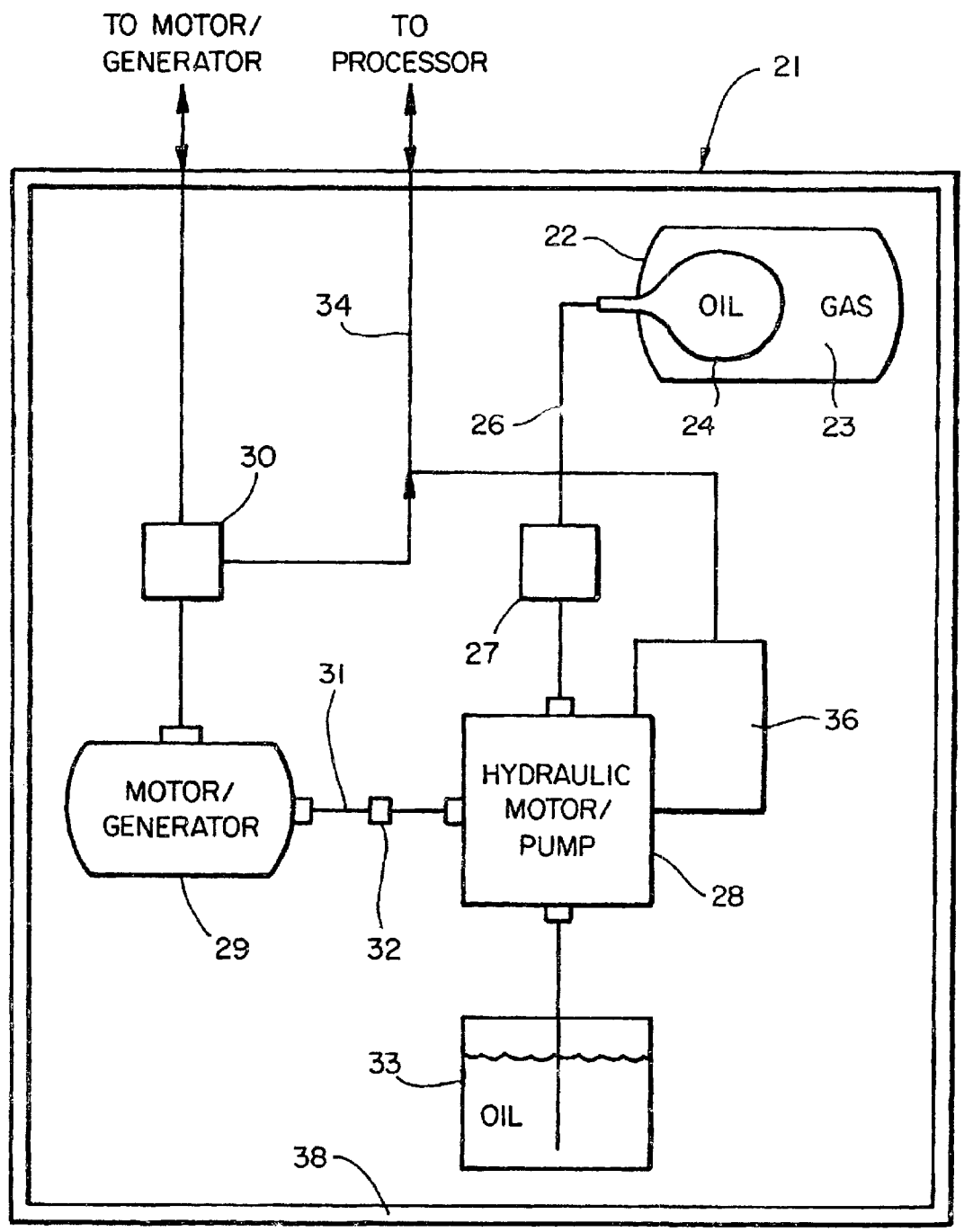
FIG_3

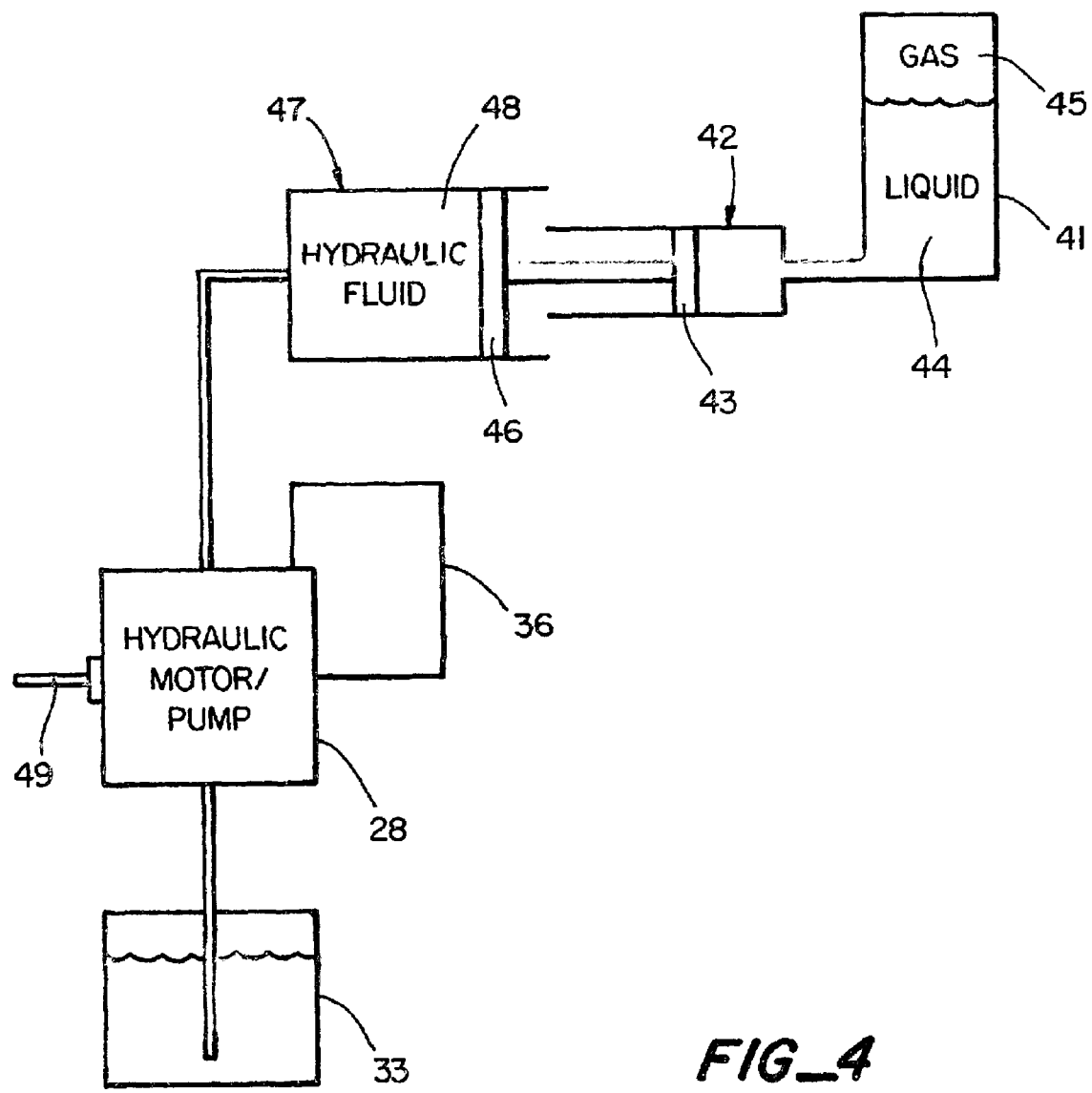
FIG_4

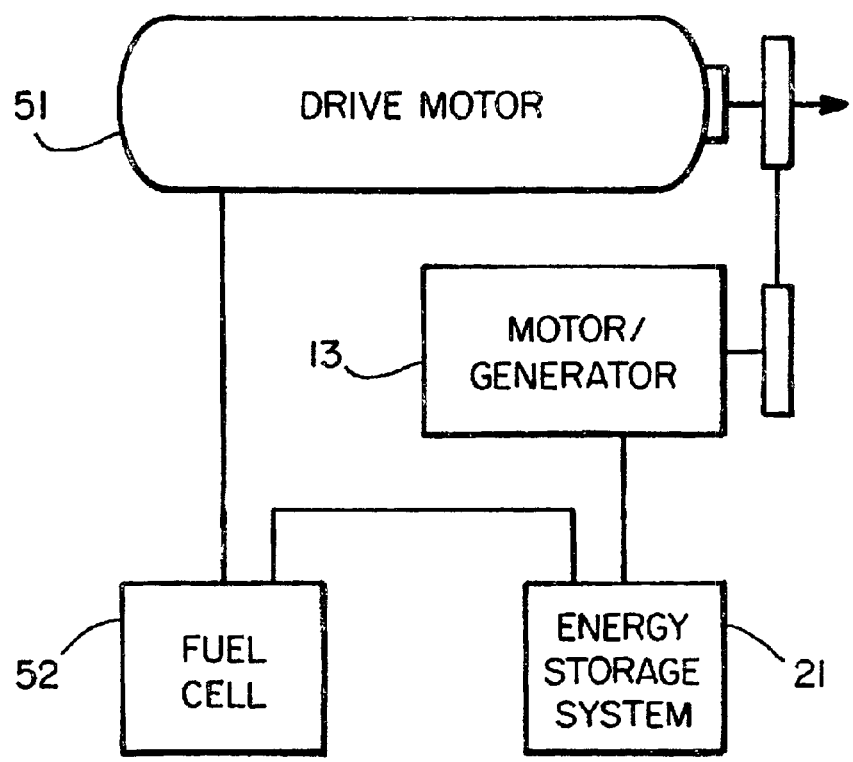
FIG_5
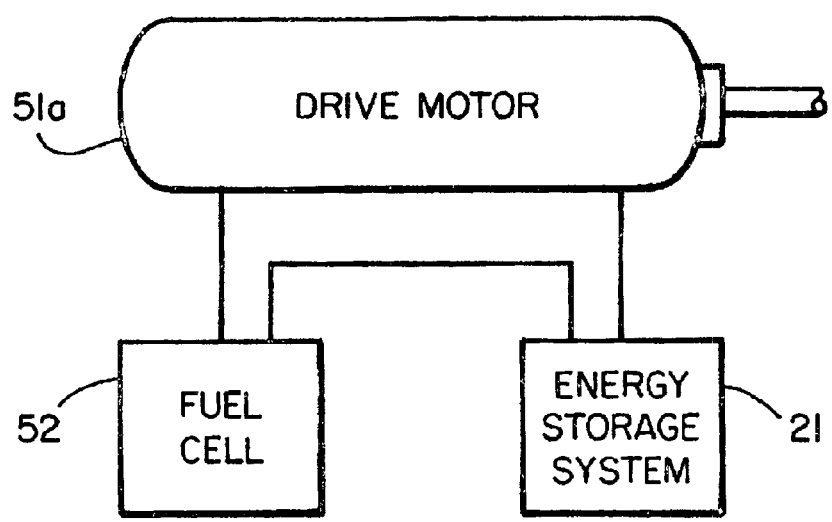
FIG_6

HYBRID VEHICLE AND ENERGY STORAGE SYSTEM AND METHOD

RELATED APPLICATIONS

This application claims priority to Provisional Application Ser. No. 60/237,457 filed Oct. 2, 2000.

BRIEF DESCRIPTION OF THE INVENTION

This invention relates generally to hybrid vehicles, and more particularly to an energy storage system for applying auxiliary power to a hybrid vehicle, and more particularly to an energy storage system which stores energy by compressing a compressible fluid or gas and converting such stored energy to electrical energy to drive an electric motor/generator which boosts the engine output torque. Under certain operating conditions, the motor/generator generates electrical energy which is used to compress the gas to store energy.

BACKGROUND OF THE INVENTION

In a hybrid vehicle, a plurality of prime movers are available. Typically such prime movers include an engine, such as an internal combustion engine, and a motor/generator, either interposed between the engine and the vehicle transmission or in parallel thereto for adding torque to supplement the torque provided by the prime mover (i.e. engine or motor). The motor/generator can act as a generator to convert vehicle kinetic energy into electrical energy for storage in a storage device such as a battery. This function as a generator can be in furtherance of the driver's request for the vehicle to decelerate (regenerative braking) or when the vehicle is operating downhill, or during operation of the engine at high efficiency to generate electrical energy to maintain the charge on the battery.

FIG. 1 schematically shows a hybrid vehicle in accordance with the prior art. The vehicle includes a prime mover, such as an internal combustion engine or electric motor 11, which has a mechanical connection to a motor/generator 13, as for example by a drive shaft 12. The motor/generator may be in parallel or series with the engine and drive the drive shalt through gears or pulleys. The motor/generator drive shaft is coupled to a drive train 14 which drives wheels 16. The drive train has a transmission which may be manual or automatic. Clutches may be interposed in the drive train. A controller or processor 17 receives inputs from the driver, such as accelerator position, brake position, vehicle speed, etc. and controls operation of the prime mover and motor/generator. When the driver begins driving the vehicle, the computer may connect the motor/generator to receive energy from battery 18 and assist in driving the wheels in unison with the prime mover or as the motive power. When the vehicle achieves the desired speed, the engine takes over exclusively. When the driver wishes to accelerate, electrical energy is supplied to the motor/generator to apply auxiliary power to the drive train. This permits the use of a smaller engine and yet achieve desired acceleration. Auxiliary power can also be applied for hill climbing or the like. On the other hand, when the driver applies the brakes, the motor/generator is switched to act as a generator adding load, permitting faster stopping, and generating electricity for the purpose of recharging the battery 18. Likewise, during deceleration or downhill operation it generates electricity which is used to charge the energy storage system. This a brief description of the operation of a hybrid vehicle and its operation and is well-known in the art. Other energy boosters using electric power have included flywheels, capacitors and chemical batteries. Hydro-pneumatic systems have used mechanical means to transfer energy to and from a vehicle.

Operating efficiency improvements to vehicles using hybrid configurations have been mitigated by the availability of a practical means of energy storage. Problems with storing, transferring and effectively controlling the amounts of energy needed for an effective hybrid vehicle configuration have been encountered with chemical batteries, flywheels, capacitors and hydro-pneumatic systems. Problems with each means of energy storage have hampered and delayed the introduction of an effective hybrid. Chemical batteries have been adopted for use with currently available hybrids, but even the most promising batteries have serious problems, and concerns persist. To achieve acceptable regenerative turnaround efficiencies, chemical batteries must be heavy and take up considerable volumetric space. Large size and heavy weight are needed to effectively augment the function of the prime mover in a parallel or series configuration of the motor/generator.

Issues of earnest concern to manufacturers and consumers of hybrid vehicles include the size, weight and initial cost of the battery pack, the limited life span of the battery pack and the high replacement costs. Also of serious concern is the exposure to risk because of explosive gases created during the recharging process and the shear size and toxic nature of the battery materials themselves. Ultimately the costs and problems associated with the disposal and recycling of very large amounts of such toxic materials also make the use of chemical batteries problematic as a means of energy storage.

Hydro-pneumatic storage of energy has proven to be a highly effective and efficient means of storing energy for both series and parallel hybrid configurations. Proven examples of successful hydro-pneumatic systems are well known and their functions are well understood, but serious problems exist with safety. Relatively large diameter high pressure lines must be routed from one point on the vehicle to another. Relatively large volumes of highly pressurized liquid must be transferred from the point of storage to the point of use through these lines. These lines represent an exposure to risk that has been determined to be intolerable. If these problems were eliminated, the feasibility of adopting pressurized gas as an acceptable means of energy storage for a hybrid vehicle would become practical.

OBJECTS OF THE INVENTION

It is the object of this invention to provide an energy storage system which utilizes pressurized gas as the means for providing a safe, inexpensive and reliable means of energy storage for use in a hybrid vehicle.

A further object of the invention is to provide a means of energy storage and system which is conveniently and inexpensively adaptable into the drive train of currently produced vehicles with internal combustion engines.

A further object of the invention is to provide a means of energy storage which is conveniently and inexpensively adaptable to the drive train of fuel cell-powered vehicles.

A further object of the invention is to enable a hybrid vehicle to utilize electrical energy for the purpose of pressurizing a gas for the storage of energy, utilizing the stored energy, and, in turn, providing electrical energy back to the hybrid vehicle.

A further object of the invention is to enable electrical current to be controlled by the mechanical manipulation of a pressurized compressible medium.

A further object of the invention is to enable the energy storage means to respond to and interact with the vehicle's existing electronic engine control system.

A further object of the invention is to enable the energy storage means to respond to and react with the vehicle's braking system.

A further object of the invention is to allow for a smaller packaging of the power unit by the utilization of an intensifier to convert the high pressures possible in modern lightweight pressure vessels to the lower pressures used by inexpensive and readily available rotating equipment.

A further object of the invention is to enclose the components involving high pressure inside a safety enclosure comprised of materials similar to those used for crash-protection air bags, thus providing an additional supplemental restraint system for the protection of passengers and/or cargo.

SUMMARY OF THE INVENTION

This invention relates generally to an energy storage system for use in hybrid vehicles. The system provides auxiliary power to a prime mover of any type including internal combustion engines or fuel cell motors. The energy storage system includes two motor/generators connected in such a fashion that when one acts as a generator, the other acts as a motor, with their roles being reversed periodically. One motor/generator is connected to the prime-mover/drive train and the other motor/generator is connected to a pressure apparatus. The rotation of the motor/generator which is connected to the drive train converts vehicular inertia during deceleration and braking and during periods of highly efficient operation into electrical current. The electrical current is transferred to the second motor/generator where the force of rotation is converted by a hydraulic pump into energy stored in a pressurized gas. A hydraulic motor/pump driven by the energy from the pressurized gas rotates the second motor/generator to provide electrical current to the first motor/generator which is connected to the vehicle drive train. This provides additional motive power for the vehicle during periods of acceleration, hill climbing, maintaining steady speeds over varying terrains and the like.

DESCRIPTION OF THE DRAWINGS

The invention will be more clearly understood from the following description when read in conjunction with the accompanying drawings of which:

FIG. 1 is a schematic block diagram of a prior art hybrid vehicle.

FIG. 2 is a schematic diagram of a hybrid vehicle incorporating an energy storage system in accordance with the present invention.

FIG. 3 is a schematic diagram of an energy storage system in accordance with the present invention.

FIG. 4 shown an alternate means for compressing a gas for storage of energy.

FIG. 5 shows a hybrid vehicle drive system employing a fuel cell and an auxiliary energy storage system in accordance with the present invention.

FIG. 6 shows another configuration of a hybrid vehicle drive system employing a fuel cell and auxiliary energy storage system.

DESCRIPTION OF PREFERRED EMBODIMENTS

FIG. 2 is a schematic block diagram of a hybrid vehicle employing an energy storage system 21 incorporating the present invention. In other respects, like reference numerals have been applied to the same parts as in FIG. 1. FIG. 3 shows the configuration of the energy storage system 21. As described, energy is stored by compressing a compressible gas. In this regard, the system includes a high-pressure, light weight composite pressure vessel or multiple vessels 22 which are filled with a compressible gas 23. A liquid such as vegetable oil is pumped into pressure vessels and compresses the gas to store energy. In the alternative, the liquid is expelled under the pressure of the pressurized gas. For example the pressurized vessel can contain a bladder 24 which expands when liquid is forced into the bladder and compresses the gas. Other gas-compressing mechanisms will be presently described. The liquid is pumped into the bladder and received from the bladder via an intensifier 27 connected to receive hydraulic fluid from a hydraulic motor/pump 28. The intensifier receives hydraulic fluid from the hydraulic motor/pump at one pressure and serves to increase the pressure of the liquid applied to the bladder (pressure vessel), and vice versa. An electric motor/generator 29 is coupled to the hydraulic motor/pump 28 by shaft 31 and coupling member 32. The processor controls the operation of the motor/generators 13 and 29 so that one or the other acts as a motor or generator as schematically shown by the polarity control 30. In operation, when the motor/generator 29 receives electrical energy from the motor/generator 13 it drives the hydraulic motor/pump , pumping hydraulic fluid (oil) from the reservoir 33 to the intensifier 27 which drives the oil in line 26 into the pressure vessel to compress the gas 23, thereby storing energy. This occurs, as explained above, during deceleration, braking, downhill motion or during specifically identified periods of efficient operation of the vehicle as controlled by the processor 17. When the processor 17 senses the need for additional torque, either for uphill climbing for acceleration or for maintaining steady speeds, the processor provides a signal to hydraulic control 36 which controls the volume of hydraulic fluid entering the hydraulic motor/pump 18 thereby controlling the speed of rotation of the generator 29 to coincide with the amount of current delivered to the electric motor/generator 13 to provide the required additional power to the prime mover.

It is observed that the motor/generator 13 associated with the engine consistently rotates in a single direction regardless of whether it is generating electrical current or receiving electrical current. The motor/generator connected to the hydraulic motor/pump changes direction of rotation depending on whether it is receiving or delivering electrical current.

The complete energy storage system including high-pressure vessels 22, intensifier 27, hydraulic motor/pump 28, oil reservoir 33 and electric motor/generator can all be housed within an enclosure 38 which can protect the passengers from any physical failure of any of the components of the system or during collision. The energy storage system can be quite compact. It is estimated that an energy storage system for delivery vehicles and sport utility vehicles would require a power pack of approximately 4–5 cubic feet or less, while a power pack for city buses, trucks and the like, may require a power pack of approximately 8–9 cubic feet or less. FIG. 4 shows another high-pressure arrangement. A high pressure vessel 41 is connected to high pressure cylinder 42 which includes a piston 43. The cylinder is filled with pressurized liquid 44 which partly fills the pressure vessel 41 to compress gas 45. The piston 43 is driven by piston 46 in lower pressure cylinder 47. The two pistons act as an intensifier to either move to drive the high pressure liquid into the vessel 41 and compress the gas, or to move and deliver medium pressure hydraulic fluid 48 in the cylinder 47 to drive the hydraulic motor/pump 28 which drives the generator 29 via shaft 49 to generate electricity as described above, or the hydraulic motor/pump is driven to deliver lower pressure hydraulic fluid from the low pressure reservoir 33 at medium pressure to the cylinder 47 to pressurize the gas 45 via high pressure cylinder 42. Although not shown in FIG. 4, the energy storage system is designed in an enclosure such as 38 described in connection with FIG. 3. It is of course apparent that in many applications an intensifier, shown in FIGS. 3 and 4, is not required. The hydraulic motor/pump may be connected directly to the pressure vessel.

The energy storage system combines the best function of electric boost with the best attributes of compressed gas energy storage. It is a safe, clean and reliable form of electric power without the drawbacks of chemical batteries, capacitors or flywheels. Controlling the electric current becomes a function of mechanically controlling the flow of high-pressure hydraulic fluid.

The complete energy storage system including high-pressure vessels 22, intensifier 27, hydraulic motor/pump 28, oil reservoir 33 and electric motor/generator can all be housed within an enclosure 38 which can protect the passengers from any physical failure of any of the components of the system or during collision. The energy storage system can be quite compact. It is estimated that an energy storage system for delivery vehicles and sport utility vehicles would require a power pack of approximately 4–5 cubic feet or less, while a power pack for city buses, trucks and the like, may require a power pack of approximately 8–9 cubic feet or less. FIG. 4 shows another high-pressure arrangement. A high pressure vessel 41 is connected to high pressure cylinder 42 which includes a piston 43. The cylinder is filled with pressurized liquid 44 which partly fills the pressure vessel 41 to compress gas 45. The piston 43 is driven by piston 46 in lower pressure cylinder 47. The two pistons act as an intensifier to either move to drive the high pressure liquid into the vessel 41 and compress the gas, or to move and deliver medium pressure hydraulic fluid 48 in the cylinder 47 to drive the hydraulic motor/pump 28 which drives the generator 29 via shaft 49 to generate electricity as described above, or the hydraulic motor/pump is driven to deliver lower pressure hydraulic fluid from the low pressure reservoir 33 at medium pressure to the cylinder 47 to pressurize the gas 45 via high pressure cylinder 42. Although not shown in FIG. 4, the energy storage system is designed in an enclosure such as 38 described in connection with FIG. 3. It is of course apparent that in many applications an intensifier, shown in FIGS. 3 and 4, is not required. The hydraulic motor/pump may be connected directly to the pressure vessel.

In vehicles which run on compressed natural gas, the existing pressure vessels can serve the dual purpose of storing the natural gas at high pressure for combustion purposes and as the vessel in which the gas can be compressed and used to drive a hydraulic motor/pump to deliver auxiliary power to the motive means in time of need and to store power in the form of compressed gas. This would enable the use of a smaller and more efficient engine. This would be especially useful for buses and delivery vehicles.

FIG. 5 shows the inventive energy storage system 21 connected via the motor/generator 13 to a drive motor 51 driven from a fuel cell. The motor/generator 13 is shown connected in parallel to the drive motor 51. Not shown is the processor associated with the hybrid vehicle for controlling the operation of the fuel cell energy storage system 21 and drive motor 51. In another embodiment, FIG. 6, the drive motor 51a may serve either as the drive motor or as the generator for delivering electrical power to the energy storage system. That is, the function of the motor/generator is incorporated in the drive motor 51a.

The present invention is comprised of well-developed components of exceptional reliability and low cost. This enables the building of an affordable and practical hybrid vehicle with a long-lasting and highly efficient energy storage system. Because of the well-developed nature and high durability of the components used, this design is not subject to failure after a limited number of discharges, as is the case with chemical batteries. This invention will easily last at least as long as the heat engine or fuel cell with which it is coupled. The hybrid vehicle is capable of allowing for a more active and finely tuned load-leveling function at much lower cost than can be accomplished with chemical batteries. The inevitable failure of chemical batteries and the dependence upon the electrical current controllers required by chemical battery systems presents unnecessarily high costs and exposure to failure. This embodiment eliminates the electrical current controller and chemical batteries. Consequently, the hybrid described in this invention allows for a more sophisticated usage of secondary power and a more finely tuned load-leveling function at a lower initial cost, and a much lower operating cost than can be accomplished with chemical battery-powered hybrids.

The invention has been described in connection with heat engines and electric motors as the prime mover. Heat engines may include gas, diesel or compressed natural gas combustion engines. The energy storage system can also be used in electric powered subway vehicles, trolley vehicles and buses. It will be apparent that the energy storage system can be applied to any moving vehicle.

The foregoing description of the preferred embodiments of the invention have been presented for the purposes of illustration and description. It is not intended to be exhaustive or to limit the invention to the precise form disclosed, and obviously many modifications and variations are possible in light of the above teaching. The embodiments were chosen and described in order to best explain the principals of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A hybrid vehicle comprising:
   a prime mover for supplying power directly to the drive train for driving the vehicle,
   a motor/generator connected to said drive train and receiving electrical energy to supply supplemental power to said drive train or to selectively receive power from said drive train and generate electrical energy, and
   an energy storage system for storing energy in the form of a compressed gas and converting the stored energy to electrical energy to supply electrical energy to said motor/generator to supply supplemental power to the drive train or to receive electrical energy generated by said motor/generator and compress said gas to store energy in the form of compressed gas.

2. A hybrid vehicle comprising:
   a prime mover for supplying power to the drive train for driving the vehicle,
   a motor/generator coupled to said drive train for receiving electrical energy to selectively supply supplemental power to said drive train or to receive power from said drive train and generate electrical energy, an energy storage system for storing energy in the form of a compressed fluid, and a second motor/generator and a hydraulic motor/pump connected to be driven by said second motor/generator when it receives electrical energy from the motor generator and compress the fluid and to drive said second motor/generator to generate electrical energy in response to energy from said compressed fluid to supply electrical energy to said motor/generator to supply supplemental power to the drive train or to receive electrical energy generated by said motor/generator and compress said fluid to store energy as compressed fluid.

3. A hybrid vehicle comprising:

a prime mover for supplying power for driving the vehicle drive train, a first motor/generator coupled to said drive train for receiving electrical energy to supply supplemental power to said drive train or to generate electrical energy, and a second electrical motor/generator, a hydraulic motor/pump connected to said second motor/generator for driving said second electrical motor/generator to generate electrical energy, or to be driven by said second electrical motor/generator to pump hydraulic fluid, a pressure vessel adapted to store a compressible fluid, pressurizing means responsive to hydraulic fluid pumped by said hydraulic motor/pump to pressurize the fluid in said vessel to store energy or to drive said hydraulic motor/pump to drive said second electrical motor/generator and generate electrical energy responsive to the stored energy.

4. A system as in claim 3 in which the compressible fluid is a gas.

5. A system as in claim 3 including an intensifier connected between the hydraulic motor/pump and the pressure vessel.

6. A system as in claim 3 in which the pressurizing means comprises a liquid in direct contact with the gas.

7. A system as in claim 3 in which the pressurizing means comprises a liquid delivered to a bladder disposed within said pressure vessel.

8. A system as in claim 6 or 7 in which the pressurizing means comprises a first cylinder and piston of a first diameter for receiving the pumped hydraulic fluid and a second cylinder and piston of a second smaller diameter for delivering said liquid.

9. A hybrid vehicle as in claim 3, 4, 5, 6 or 7 in which the engine is an internal combustion engine.

10. A hybrid vehicle as in claim 3, 4, 5, 6 or 7 in which the engine is an electric motor connected to a fuel cell.

11. A hybrid vehicle as in claim 4 in which the pressure vessel is the same vessel as that which contains compressed natural gas for powering the prime mover.

12. An energy storage and delivery system comprising:

an electrical motor/generator;

a hydraulic motor/pump connected to said motor/generator for driving said electrical motor/generator to generate electrical energy or to be driven by said electrical motor/generator to pump hydraulic fluid;

a pressure vessel adapted to store a compressible fluid; and pressurizing means, including an intensifier connected between the hydraulic motor/pump and the pressure vessel, responsive to hydraulic fluid pumped by said hydraulic motor/pump to pressurize the fluid in said vessel to store energy or to drive said hydraulic motor/pump to drive said electrical motor/generator and generate electrical energy responsive to the stored energy.

13. An energy storage and delivery system comprising:

an electrical motor/generator;

a hydraulic motor/pump connected to said motor/generator for driving said electrical motor/generator to generate electrical energy or to be driven by said electrical motor/generator to pump hydraulic fluid, a pressure vessel adapted to store a compressible fluid; and pressurizing means comprising a liquid in direct contact with the compressible fluid responsive to hydraulic fluid pumped by said hydraulic pumped by said hydraulic motor/pump to pressurize the compressible fluid in said vessel to store energy and to drive said hydraulic motor/pump to drive said electrical motor/generator and generate electrical energy responsive to the stored energy, in which the pressurizing means comprises a first cylinder and piston of a first diameter for receiving the pumped hydraulic fluid and a second cylinder and piston of a second smaller diameter for delivering said liquid.

14. An energy storage and delivery system comprising:

an electrical motor/generator;

a hydraulic motor/pump connected to said motor/generator for driving said electrical motor generator to generate electrical energy or to be driven by said electrical motor/generator to pump hydraulic fluid;

a pressure vessel adapted to store a compressible fluid;

a pressurizing means comprising a liquid delivered to a bladder disposed within said pressure vessel responsive to hydraulic fluid pumped by said hydraulic motor/pump to pressurize the fluid in said vessel to store energy and to drive said hydraulic motor/pump to drive said electrical motor/generator and generate electrical energy responsive to the stored energy, in which the pressurizing means comprises a first cylinder and piston of a first diameter for receiving the pumped hydraulic fluid and a second cylinder and piston of a second smaller diameter for delivering said liquid.

* * * * *